United States Patent
Vandermeijden

(10) Patent No.: US 9,811,218 B2
(45) Date of Patent: Nov. 7, 2017

(54) LOCATION BASED OBJECT CLASSIFICATION

(71) Applicant: Synaptics Incorporated, San Jose, CA (US)

(72) Inventor: Tom Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 10 days.

(21) Appl. No.: 14/576,026

(22) Filed: Dec. 18, 2014

(65) Prior Publication Data

US 2016/0048259 A1    Feb. 18, 2016

Related U.S. Application Data

(60) Provisional application No. 62/038,231, filed on Aug. 16, 2014.

(51) Int. Cl.
G06F 3/044 (2006.01)
G06F 3/041 (2006.01)

(52) U.S. Cl.
CPC ............ *G06F 3/044* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 8,638,109 B2 | 1/2014 | De Boer et al. | |
| 2008/0100586 A1* | 5/2008 | Smart | G06F 3/0418 345/173 |
| 2009/0174679 A1* | 7/2009 | Westerman | G06F 3/03547 345/173 |
| 2012/0242617 A1* | 9/2012 | Lee | G06F 3/0418 345/174 |
| 2013/0194229 A1* | 8/2013 | Sabo | G06F 3/044 345/174 |
| 2013/0246861 A1* | 9/2013 | Colley | G06F 3/0488 714/48 |
| 2013/0321301 A1* | 12/2013 | Takeichi | G06F 3/041 345/173 |
| 2014/0176447 A1 | 6/2014 | Alameh et al. | |

* cited by examiner

*Primary Examiner* — David D Davis
(74) *Attorney, Agent, or Firm* — Osha Liang LLP

(57) ABSTRACT

A processing system for a capacitive sensing device includes a sensor module and a determination module. The sensor module is for performing capacitive sensing in a sensing region using sensor electrodes. The sensing region includes a first sub-region and a second sub-region. The determination module is for detecting a first input object in the sensing region upon an initial contact of the first input object in the sensing region, determining positional information of the first input object, and determining, from the positional information, that the first input object is located in the second sub-region of the sensing region. Responsive to the first input object being located in the second sub-region of the sensing region, the determination module suppresses reporting of the first input object.

19 Claims, 4 Drawing Sheets

US 9,811,218 B2

LOCATION BASED OBJECT CLASSIFICATION

CROSS REFERENCE TO RELATED APPLICATIONS

This application claims priority under 35 U.S.C. §119(e) to U.S. Provisional Patent Application Ser. No. 62/038,231, filed on Aug. 16, 2014, and entitled, "Location Based Object Classification." U.S. Provisional Patent Application Ser. No. 62/038,231 is incorporated herein by reference in its entirety.

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for a capacitive sensing device. The processing system includes a sensor module and a determination module. The sensor module is for performing capacitive sensing in a sensing region using sensor electrodes. The sensing region includes a first sub-region and a second sub-region. The determination module is for detecting a first input object in the sensing region upon an initial contact of the first input object in the sensing region, determining positional information of the first input object, and determining, from the positional information, that the first input object is located in the second sub-region of the sensing region. Responsive to the first input object being located in the second sub-region of the sensing region, the determination module suppresses reporting of the first input object.

In general, in one aspect, embodiments of the invention relate to an input device. The input device includes an array of sensor electrodes configured to sense input objects in a sensing region of the input device. The input device further includes the sensing region including a first sub-region and a second sub-region. The input device includes a processing system configured to detect a first input object in the sensing region upon an initial contact of the first input object in the sensing region, determine positional information of the first input object, and determine, from the positional information, that the first input object is located in the second sub-region of the sensing region. The processing system is further configured to, responsive to the first input object being located in the second sub-region of the sensing region, suppress reporting of the first input object.

In general, in one aspect, embodiment of the invention relate to a method for capacitive sensing. The method includes detecting a first input object in a sensing region upon an initial contact of the first input object in the sensing region. The sensing region includes a first sub-region and a second sub-region. The method further includes determining positional information of the first input object, and determining, from the positional information, that the first input object is located in the second sub-region of the sensing region. The method further includes, responsive to the first input object being located in the second sub-region of the sensing region, suppressing reporting of the first input object.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

DETAILED DESCRIPTION

Figure 1:
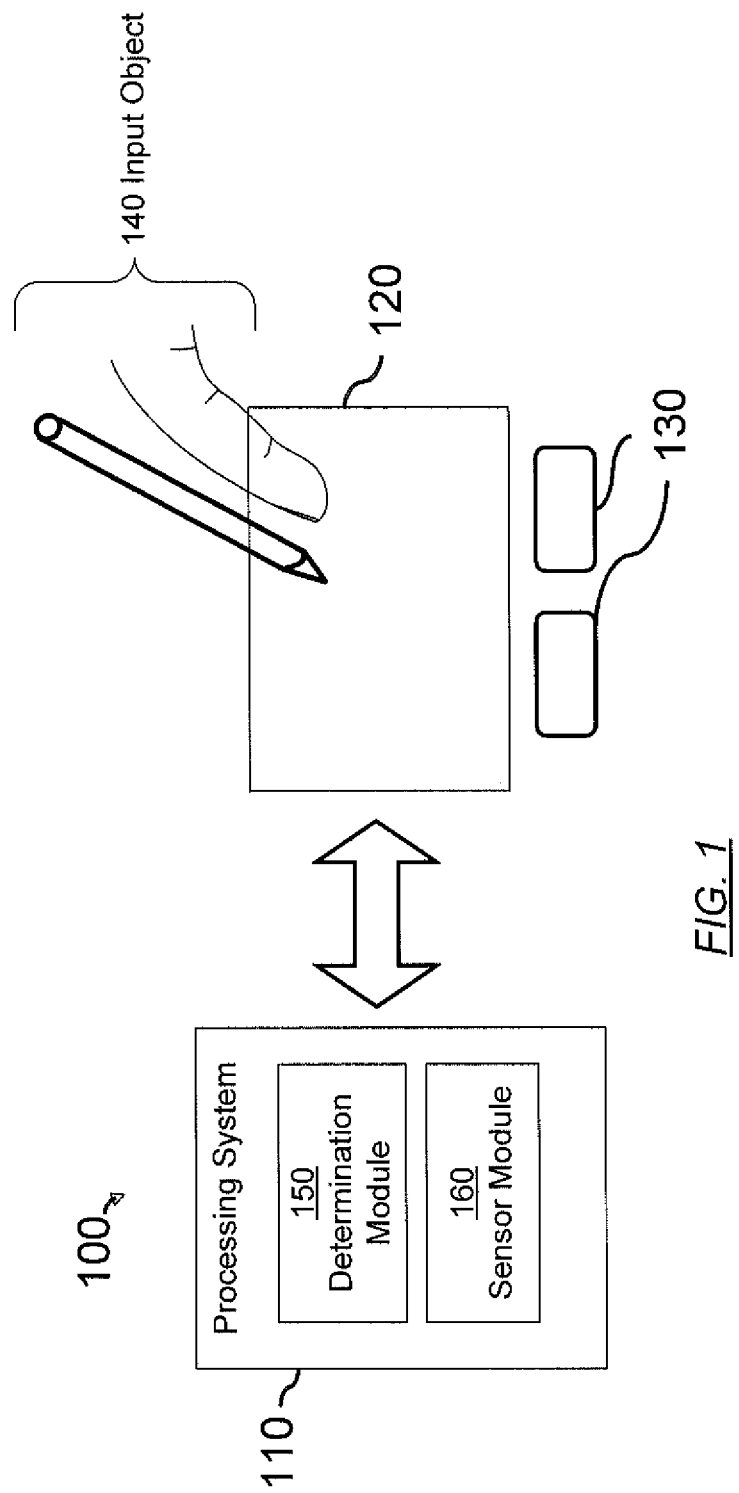
FIG. 1 shows a block diagram of an example system that includes an input device in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to suppressing one or more input objects in the sensing region based on the location of the input object(s) and/or other input objects. Specifically, an input object is detected in the sensing region. Based on the detection, positional information is determined and used to identify the sub-region in which the input object is located. In response to the sub-region, whether the input object is reported may be determined. In some embodiments, suppressing an input object may include the input device, or any device detecting input objects in the sensing region, refraining from reporting the input object to another device, e.g., a host device. In other embodiments, suppressing an input object may include reporting the input object device, but identifying the input object as "suppressed" so that the host device knows to ignore the input object. In additional embodiments, location based object classification may be performed by the host device after all input objects are reported by the input device to the input device. It should be understood that the recognition of and suppression of input objects may be performed on any individual device or combination of devices.

One or more embodiments of the invention do not rely on temporal determinations for suppression of input objects. In other words, one or more embodiments do not consider a length of time in which the input object is at a particular location. Thus, if the initial placement of the input object is in a sub-region of the sensing region in which suppression occurs, then the input object is suppressed upon the initial placement in one or more embodiments of the invention. By not relying on temporal determinations, suppression may occur immediately without having erroneous reporting of input objects while waiting to determine whether time limits are achieved in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular faint of input object is used. Although the singular form is used, multiple input objects exist in the sensing region (120). Further, the particular input objects that are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field.

Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Regardless of whether mutual capacitance or absolute capacitance sensing methods are used, modulating the sensor electrodes may be referred to as driving the sensor electrode with a varying voltage signal or exciting a sensor electrode. Conversely, sensor electrodes may be connected to a ground (e.g., system ground or any other ground). Connecting the sensor electrodes to a ground or holding electrodes substantially constant may be referred to as connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. The effect(s) may be the transmitter signal, a change in the transmitter signal caused by one or more input objects and/or environmental interference, or other such effects. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine a presence of an input object in the sensing region, determine a sub-region of the sensing region having the input object, and report and/or suppress reporting of the input object based, at least in part, on the sub-region. The determination module (150) may further include functionality to determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules as opposed to one or more of the modules discussed above. Example alternative or additional modules include hardware operation modules for operating hardware such as sensor electrodes and display screens, data processing modules for processing data such as sensor signals and positional information, reporting modules for reporting information, identification modules configured to identify gestures, such as mode changing gestures, and mode changing modules for changing operation modes. Further, the various modules may be combined in various ways, such that a single module or the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information," as used herein, broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally, regardless of the particular type of medium used to carry out the distribution. For example, software instructions in the form of computer-readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer-readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
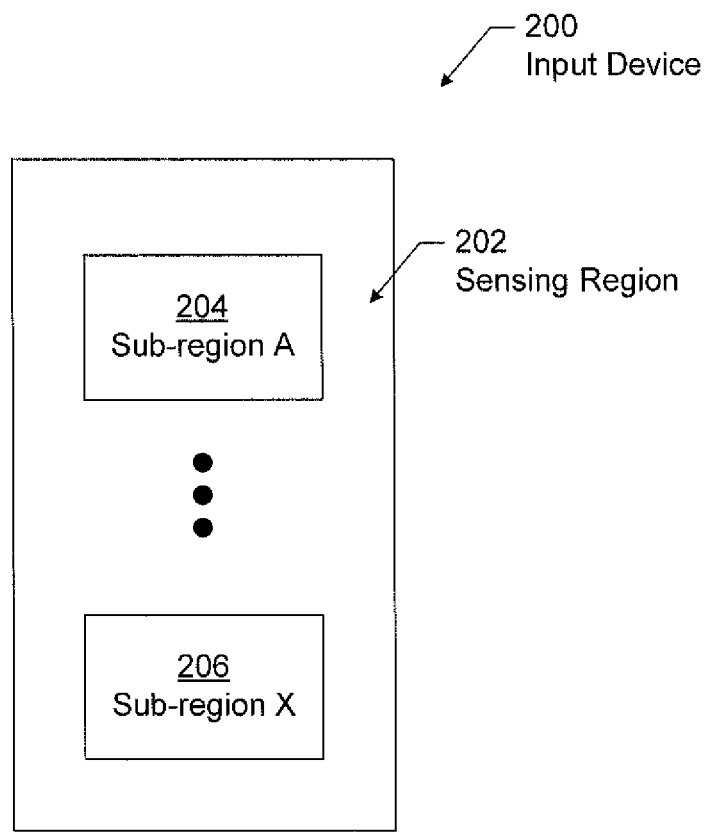
FIG. 2 shows a logical diagram of an input device in accordance with one or more embodiments of the invention.

FIG. 2 shows a logical schematic diagram of an input device (200) having a sensing region (202) in accordance with one or more embodiments of the invention. As discussed above, the sensing region is any area in which the input device may detect an input object. As shown in FIG. 2, the sensing region (202) may include multiple sub-regions (e.g., sub-region A (204), sub-region X (206)). A sub-region (e.g., sub-region A (204), sub-region X (206)) is a partition of the sensing region (202).

In one or more embodiments of the invention, sub-regions are a partitioning of the surface sensing region, the above surface sensing region, and/or a combination of the surface sensing region and the above surface sensing region. Alternatively or additionally, sub-regions may be a partitioning of the entire sensing region as projected onto the surface sensing region. In such embodiments, an input object in the above surface sensing region may be treated as being on the surface sensing region for the purpose of identifying the sub-region.

Sub-regions may be virtually any shape and size, may be two-dimensional or three-dimensional, and may be heterogeneous in terms of shapes and sizes. Further, sub-regions may be located in virtually any configuration with respect to each other. Thus, unless expressly defined in the claims, the size, shape, and geographic location of sub-regions are not limited to any specific configuration. Further, one or more of the sub-regions may or may not be a contiguous region. For example, a portion of a sub-region may be separate and not connected to another portion of the sub-region.

In one or more embodiments of the invention, sub-regions do not overlap. In such embodiments, each location may belong to only one sub-region. Further, the sub-regions may be a complete partitioning of the sensing region. In such embodiments, each location in the sensing region may have a corresponding sub-region. In other words, no location exists in the sensing region that does not have a corresponding sub-region. Thus, in some embodiments, each location of the sensing region may be in one, and only one, corresponding sub-region.

In other embodiments, sub-regions may overlap. Further, the sub-regions may be only a partial partitioning of the sensing region. In other words, a location may correspond to more than one sub-region and/or a location may exist that does not have a corresponding sub-region.

In one or more embodiments of the invention, the use of the term substantially in the claims may refer to greater than sixty percent, seventy-five percent or more, and/or may refer to on at least two sides. Thus, sensing region X may substantially surround sensing region Y when the at least seventy-five percent of sensing region X surrounds sensing region Y. As another example, sensing region X may substantially surround sensing region Y when at least two sides of sensing region X is between sensing region Y and the side of the sensing region and any bezel of the input device.

In one or more embodiments of the invention, each sub-region may be assigned a corresponding restrictive level attribute. The restrictive level is the degree at which the input device determines that any input object detected in the sub-region is or is not intended as input. The lower the restrictive level may indicate a greater likelihood that any detected input object in the sub-region is intended to be input. In other words, the greater the restrictive level, the less likely that an input object is reported. For example, in a scenario in which the input device is a mobile phone, a sub-region near where a user most likely grips a mobile phone may have a greater restrictive level than a region in the middle of the sensing region. Thus, a grip may be less likely to be reported than a touch in the middle of the sensing region.

In one or more embodiments of the invention, each sub-region may be associated with rules defining whether to suppress and which, if any, of the input object(s) to suppress in the sensing region. The rules may be defined according to the validity level attribute. In one or more embodiments of the invention, each rule may have one or more of the following input parameters: current sub-region of input object, previous sub-region of input object, number of input objects, current sub-region of each of the other input object(s), previous sub-region of each of the other input object(s), size of the input object, and length of the input object along one or two axis. Alternative or additional input parameters may be used without departing from the scope of the invention. In one or more embodiments of the invention, the output of the rule is whether to suppress an input object and which input object, if any, to suppress.

Figure 3:
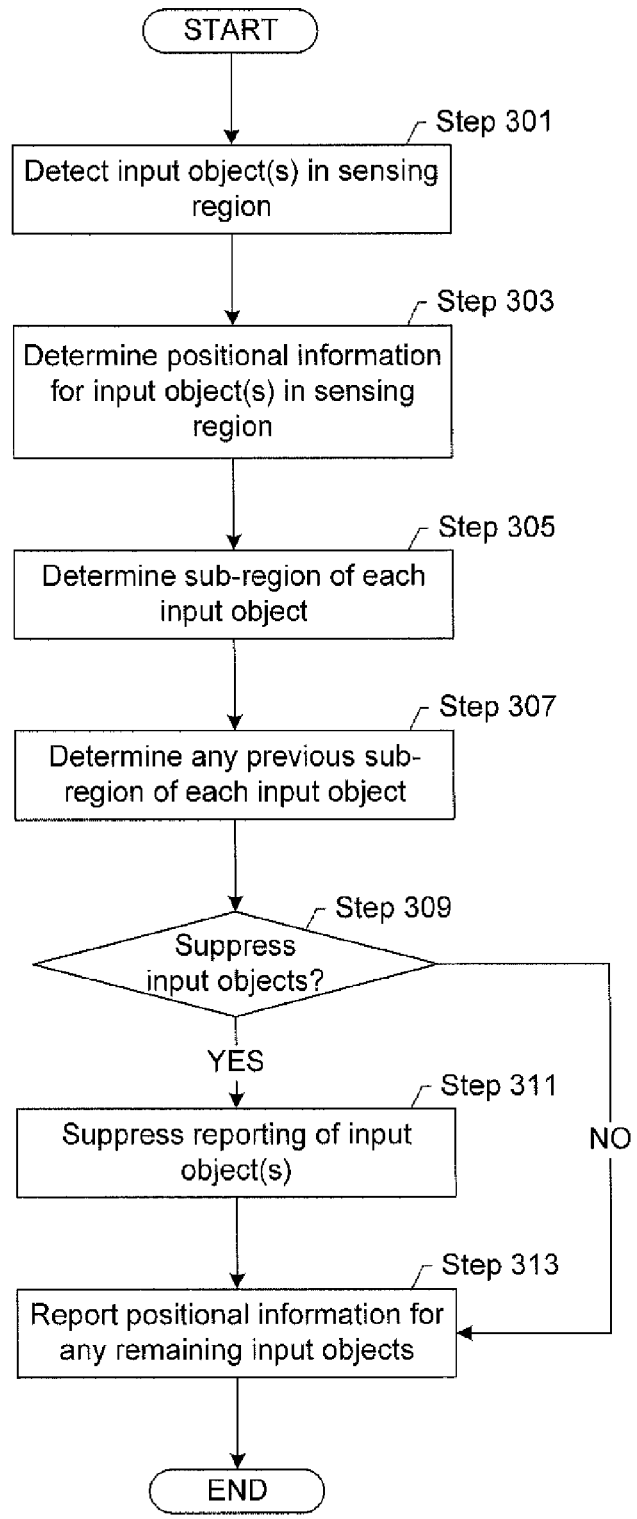
FIG. 3 shows a flowchart in accordance with one or more embodiments of the invention.

FIG. 3 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention. The various steps of FIG. 3 may be performed by the input device, by firmware on the host, by a host operating system, by another component, or by a combination of components. For example, the various steps may be performed by the determination module in accordance with one or more embodiments of the invention.

In Step 301, an input object is detected in the sensing region in accordance with one or more embodiments of the invention. In one or more embodiments of the invention, detecting the input object in the sensing region may include, for example, a sensing module driving sensor electrodes to transmit transmitter signals through the sensing region and receive resulting signals using the same or different sensor electrodes. The resulting signals may include effects of noise as well as any input objects in the sensing region. In one or more embodiments of the invention, measurements are obtained from the resulting signals. The measurements may be filtered and adjusted for a baseline. After adjusting the measurements, any values that satisfy a threshold may be determined as corresponding to an input object. In other words, an input object may be detected when the value of the measurements satisfies a threshold in accordance with one or more embodiments of the invention.

In Step 303, positional information for input object(s) in the sensing region is determined in accordance with one or more embodiments of the invention. Determining the positional information may include determining a size of the input object or length of the input object along one or more axis. Determining the positional information may further include determining the coordinate of the input object along each axis of the sensing region, including the above surface sensing region. In some embodiments, the positional information defines the location as a single point in which the greatest measurement value is determined. In alternative or additional embodiments, the positional information defines the span of points for which corresponding measurement values which satisfy the threshold are identified. Further, the positional information may further include velocity. In such a scenario, previous frames of scanning the sensing region may be used to determine the positional information.

When multiple input objects are present in the sensing region, positional information for each of the multiple input objects are determined. In other words, each input object may have corresponding positional information defined for the input object.

In Step 305, a sub-region of each input object in the sensing region is determined in accordance with one or more embodiments of the invention. Using the location in the positional information, the corresponding sub-region to the location is determined based on a mapping between locations and sub-regions. In other words, by accessing the mapping, the sub-region is identified from the location.

In Step 307, any previous sub-region of each input object is determined in accordance with one or more embodiments of the invention. In one or more embodiments of the invention, the determination module, for a period of time, maintains information about past locations for each input objects. Input objects may be tracked in the sensing region based on a contiguous or overlapping location relationship between each subsequent location of the input object. In other words, input objects may be traced based on a path of detection existing over the span of one or more frames from the previous location(s) to the current location. With the determination of the path, the determination module may also identify one or more sub-regions in the path. Thus, the previous sub-regions are any sub-regions in the path of an input object's prior locations of detection.

In Step 309, a determination is made whether to suppress any input object in accordance with one or more embodiments of the invention. The determination may be based on one or more rules for suppression. In one or more embodiments of the invention, the determination module may iterate from the most restrictive rules to the most liberal rules. In one or more embodiments of the invention, if any of the rules specify to report the input object, then the input object is not suppressed. In other embodiments of the invention, if any rules specify to suppress the input object, then the input object is suppressed. Alternatively or additionally, rules may be associated with a priority value defining which rule controls when the result of each rule differs.

To determine whether to suppress an input object, the input parameters for the rule are obtained from the positional information. For example, the determination may be performed by obtaining a length of the input object along an axis, determining whether the length satisfies a length threshold for the sub-region in which the input object is located, and suppressing the input object when the length satisfies the length threshold. The rule is applied to the input parameters to obtain a result.

Continuing with FIG. 3, if a determination is made to suppress reporting of an input object, then the reporting of the input object is suppressed in accordance with one or more embodiments of the invention. Suppressing reporting of the input object may include not reporting the input object to an application, operating system, and/or host device. Alternatively or additionally, suppressing reporting of the input object may include attaching a warning to the reporting of the input object to indicate that the input object may be invalid. By way of one of many possible examples, the determination module may report the positional information of a suppressed input object with a warning to the operating system, and the operating system may omit the input object from reporting to the application.

In Step 313, positional information for any remaining input objects is reported in accordance with one or more embodiments of the invention. The reporting of any remaining input objects may be performed concurrently with the suppressing of the reporting of the input object. In one or more embodiments of the invention, reporting the positional information may be performed by transmitting the positional information to the firmware, operating system, application, or any combination thereof in a format required by the receiver.

Figure 4:
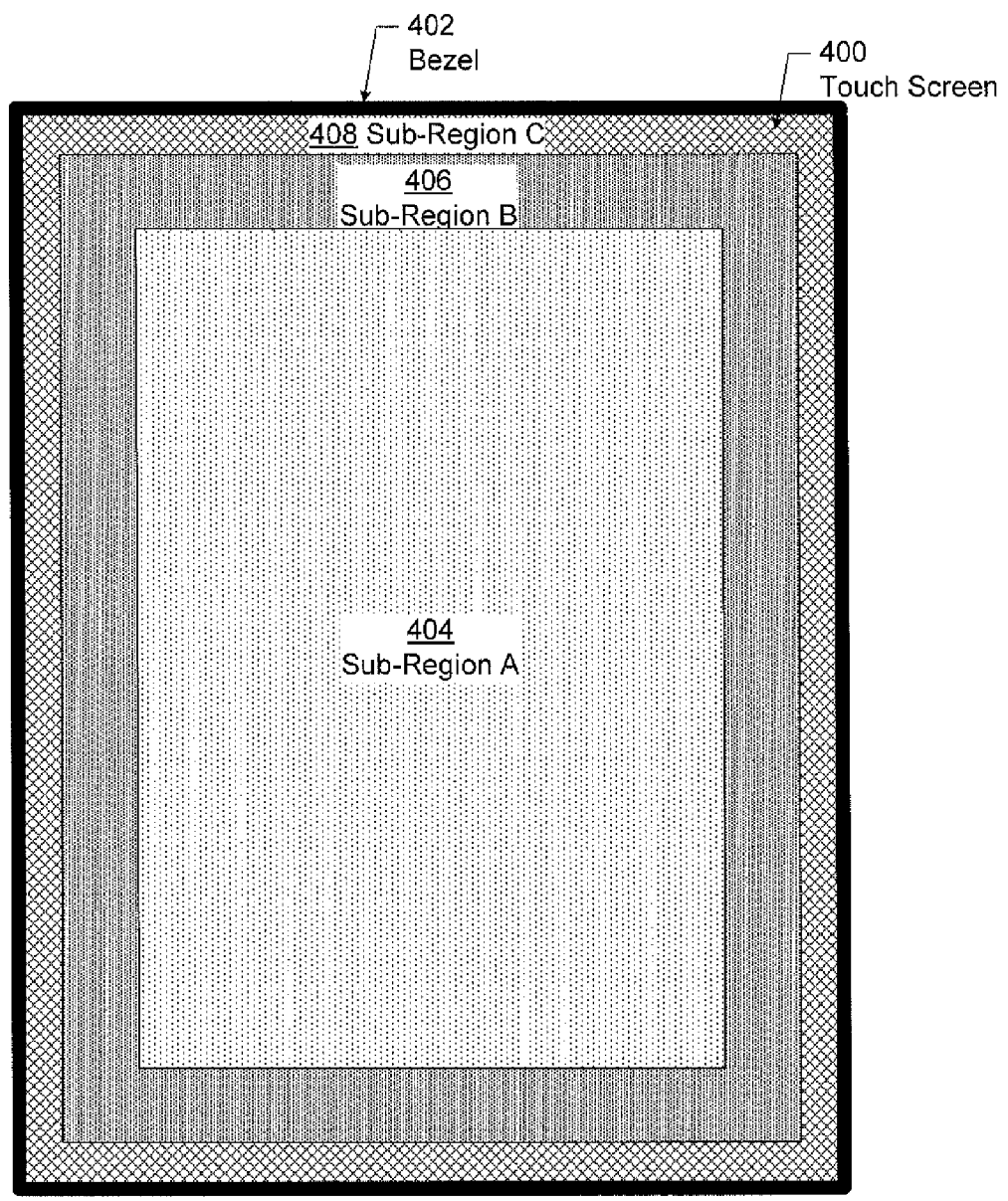
FIG. 4 shows an example in accordance with one or more embodiments of the invention.

FIG. 4 shows an example in accordance with one or more embodiments of the invention. In the following example, consider the scenario in which the input device is touch screen (400) of a mobile phone. Around the touch screen (400) is a thin bezel (402) denoted by the thick border in FIG. 4, The touch screen (400) has a sensing region that encompasses the surface of the touch screen and the area above the surface of the touch screen to the extent that input objects in the sensing region are detectable and distinguishable from noise. The bezel (402) is relatively thin in that a user's fingers, holding the phone, may be at least partially within the sensing region.

As shown in FIG. 4, the example sensing region is partitioned into multiple concentric areas. Although FIG. 4 shows three sub-regions, more or fewer sub-regions may exist without departing from the scope of the invention. In the example in FIG. 4, sub-region A (404) is surrounded by sub-region B (406), which is surrounded by sub-region C (408). In other words, sub-region B (406) is between sub-region C (408) and sub-region A (404). Although FIG. 4 shows an example in which sub-region A (404) is entirely surrounded by sub-region 13 (406) and sub-region C (408), sub-region A (404) may extend to the top and bottom edges of the sensing region and still remain substantially surrounded by sub-region B (406) and sub-region C (408).

In the example, sub-region A (404) has the least restrictive level, while sub-region C has the most restrictive level. Sub-region B (406) may be in-between and have a restrictive level in-between sub-region A (404) and sub-region C (408). In other words, input objects are more likely to be suppressed in sub-region C (408) than in sub-region B (406).

The following are example rules that may be applied using the example configuration of sub-regions shown in FIG. 4. The following is for example purposes only and not intended to limit the scope of the invention.

In the first example rule, if only a single input object is detected in the sensing region, then the input object is not suppressed. In other words, a single input object may be anywhere in the sensing region and not suppressed. In some embodiments, the single input object is only safe from suppression when the input object is less than a length threshold. In an alternative or additional example, a rule may suppress the single input object if the single input object is first detected in sub-region C (408).

In another example, input objects that are initially detected in sub-region C (408) are suppressed upon the initial detection of the input objects in accordance with one or more embodiments of the invention. By suppressing such input objects, when a user holds the mobile device and the user's fingers extend beyond the bezel, the user's fingers do not unintentionally interact with the touch screen. Further, by performing initial suppression, the determination module immediately suppresses reporting causing any application to function properly in accordance with one or more embodiments of the invention.

In another example, if one or more input objects are initially detected in sub-region A (404) or sub-region B (406) and migrate to the sub-region C (408), then the one or more input objects are not suppressed in accordance with one or more embodiments of the invention. In other words, the rule allows input objects that migrate to sub-region C (408) after first being detected in sub-region A (404) and/or sub-region B (406).

In another example, the rule suppresses all input objects when a large input object is in sub-region A (404). In other words, if the input object is longer than a threshold length on at least one axis, the rule may consider the input object a large input object. Accordingly, the rule suppresses all input objects in the sensing region. The rule may further define that when the large input object is in sub-region B (406), then only the large input object is suppressed. In the example, the rule is designed to suppress any input objects when a user presses a palm in the middle of the sensing region. In other words, the rule is designed such that the input device does not respond, in one example, when a user merely has the input device in a pocket and a large input object is in the middle of the input device. In such a scenario, all input objects should be suppressed. However, the rule also may distinguish that case from another case in which the large input object is on the side of the sensing region, and only the large input object should be suppressed. For example, a user's thumb may be in sub-region B (406) due to the way they are holding the device. The thumb input object may be suppressed while allowing reporting of other input objects in sub-region A (404). In such a scenario, to determine whether to suppress the input objects, the length of the input object along an axis is determined. If the length satisfies a length threshold, then the input object is suppressed. If the input object is in the middle of the sensing region, then all input objects may be determined to be suppressed.

In some embodiments, the length threshold is static. In other embodiments, the length threshold varies. The length threshold may vary based on the distance between the location of the detected input object and another location in the sensing region or on the mobile phone. For example, the length threshold may vary according to the distance between the input object and the border between the sub-region A (404) and sub-region C (408) of the sensing region. The variance may be to decrease the length threshold the closer the input object is to sub-region C (408). By varying the length threshold accordingly, the closer the input object is to sub-region C (408), the more likely that the input object is suppressed. Accordingly, a palm may be suppressed while a thumb is not suppressed in sub-region A (404), and a thumb is more likely to be suppressed the closer the thumb is to sub-region C (406).

The above are only a set of example rules. Alternative or additional rules may exist and be used without departing from the scope of the invention. Further, FIG. 4 is only an example configuration. Other sub-region configurations may be used and have corresponding rules without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for a capacitive sensing device, comprising:
   a processor configured to execute instructions to perform operations comprising:
      a sensor module for performing capacitive sensing in a sensing region using a plurality of sensor electrodes, the sensing region comprising a first sub-region, a second sub-region, and a third sub-region; and
      a determination module for:
         detecting a first input object in the sensing region upon an initial contact of the first input object in the sensing region,
         determining first positional information of the first input object,
         determining, from the first positional information, that the first input object is located in the second sub-region of the sensing region,
         determining a length of the first input object, the length of the first input object being a size of the first input object along a first axis,
         determining a distance between the first input object and the third sub-region,
         determining, based on the first input object being in the second sub-region, a length threshold matching the distance between the first input object and the third sub-region,
            wherein, in the second sub-region, the length threshold varies according to the distance to the third sub-region,
         responsive to the first input object being located in the second sub-region of the sensing region and the length of the first input object being greater than the length threshold, suppressing reporting of the first input object.

2. The processing system of claim 1, wherein the length threshold is held constant in the third sub-region of the sensing region.

3. The processing system of claim 1, wherein the second sub-region of the sensing region substantially surrounds the first sub-region.

4. The processing system of claim 1, wherein the determination module is further for:
   determining that a second input object is in the first sub-region when the first input object is determined to be in the second sub-region; and
   reporting the second input object while reporting of the first input object is suppressed.

5. The processing system of claim 1, wherein the third sub-region of the sensing region substantially surrounds the second sub-region.

6. The processing system of claim 5, wherein the determination module is further for:
   determining that a location of a second input object is in at least one selected from a group consisting of the first sub-region and the third sub-region;
   suppressing reporting of all input objects in the second sub-region based the location of the second input object.

7. The processing system of claim 5, wherein the determination module is further for:
   determining, for a first time, that a location of a plurality of input objects is in the third sub-region,
   determining, for the first time, that a location of a second input object is in at least one selected from a group consisting of the first sub-region and the second sub-region, wherein the second input object is not in the plurality of input objects, and
   suppressing, for the first time, reporting of the plurality of input objects while reporting the second input object based on the location of the plurality of input objects and the location of the second input object.

8. The processing system of claim 7, wherein the determination module is further for:
   determining, for a second time, that the plurality of input objects remain in the third sub-region,
   determining, for the second time, that the second input object moved to the third sub-region, and
   suppressing, for the second time, reporting of the plurality of input objects while reporting the second input object based on the location of the plurality of input objects at the first time and the second time and the location of the second input object at the first time.

9. The processing system of claim 1, wherein the determination module is further for:
   determining that a second input object is in the first sub-region;
   determining that the second input object is a palm; and
   suppressing reporting of all input objects in the sensing region based the second input object being determined to be a palm.

10. The processing system of claim 1, wherein the determination module is further for:
    detecting a second input object in the sensing region,
    determining, from second positional information, that the second input object is located in the first sub-region of the sensing region,
    responsive to the second input object being located in the first sub-region, reporting the second input object,
    detecting a third input object in the sensing region,
    determining, from third positional information, that the third input object is located in the third sub-region of the sensing region,
    determining the length of the third input object, the length of the third input object being a size of the third input object along the first axis,
    responsive to the third input object being located in the third sub-region of the sensing region and the length being greater than the length threshold, suppressing reporting of the third input object, wherein the length threshold is constant in the third sub-region,
    wherein the second sub-region of the sensing region substantially surrounds the first sub-region and the third sub-region of the sensing region substantially surrounds the second sub-region, and
    wherein the first sub-region is less suppressive of input objects than the second sub-region and the second sub-region is less suppressive of input objects than the third sub-region.

11. An input device comprising:
    an array of sensor electrodes configured to sense input objects in a sensing region of the input device, the sensing region comprising a first sub-region, a second sub-region, and a third sub-region; and
    a processing system configured to:
        detect a first input object in the sensing region upon an initial contact of the first input object in the sensing region,
        determine first positional information of the first input object,
        determine, from the first positional information, that the first input object is located in the second sub-region of the sensing region,
        determine a length of the first input object, the length of the first input object being a size of the first input object along a first axis,
        determine a distance between the first input object and the third sub-region,
        determine, based on the first input object being in the second sub-region, a length threshold matching the distance between the first input object and the third sub-region,
            wherein, in the second sub-region, the length threshold varies according to the distance to the third sub-region,
        responsive to the first input object being located in the second sub-region of the sensing region and the length of the first input object being greater than the length threshold, suppress reporting of the first input object.

12. The input device of claim 11, wherein the length threshold is held constant in the third sub-region of sensing region.

13. The input device of claim 11, wherein the second sub-region of the sensing region substantially surrounds the first sub-region.

14. The input device of claim 11, wherein the processing system is further configured to:
    determine that a second input object is in the first sub-region when the first input object is determined to be in the second sub-region; and
    report the second input object while reporting of the first input object is suppressed.

15. The input device of claim 11, wherein the third sub-region of the sensing region being substantially surrounds the second sub-region.

16. The input device of claim 11, wherein the processing system is further configured to:
    detect a second input object in the sensing region, determine, from second positional information, that the second input object is located in the first sub-region of the sensing region, responsive to the second input object being located in the first sub-region, report the second input object, detect a third input object in the sensing region, determine, from third positional information, that the third input object is located in the third sub-region of the sensing region, determine the length of the third input object, the length of the third input object being a size of the third input object along the first axis, responsive to the third input object being located in the third sub-region of the sensing region and the length being greater than the length threshold, suppress reporting of the third input object, wherein the length threshold is constant in the third sub-region, wherein the second sub-region of the sensing region substantially surrounds the first sub-region and the third sub-region of the sensing region substantially surrounds the second sub-region, and wherein the first sub-region is less suppressive of input objects than the second sub-region and the second sub-region is less suppressive of input objects than the third sub-region.

17. A method for capacitive sensing comprising:

detecting a first input object in a sensing region upon an initial contact of the first input object in the sensing region, the sensing region comprising a first sub-region, a second sub-region, and a third sub-region;

determining first positional information of the first input object;

determining, from the first positional information, that the first input object is located in the second sub-region of the sensing region;

determining a length of the first input object, the length of the first input object being a size of the first input object along a first axis;

determining a distance between the first input object and the third sub-region, determining, based on the first input object being in the second sub-region, a length threshold matching the distance between the first input object and the third sub-region, wherein, in the second sub-region, the length threshold varies according to the distance to the third sub-region, responsive to the first input object being located in the second sub-region of the sensing region and the length of the first input object being greater than the length threshold, suppressing reporting of the first input object.

18. The method of claim 17, further comprising:

determining that a second input object is in the first sub-region when the first input object is determined to be in the second sub-region; and reporting the second input object while reporting of the first input object is suppressed.

19. The method of claim 17, further comprising:

detecting a second input object in the sensing region, determining, from second positional information, that the second input object is located in the first sub-region of the sensing region, responsive to the second input object being located in the first sub-region, reporting the second input object, detecting a third input object in the sensing region, determining, from third positional information, that the third input object is located in the third sub-region of the sensing region, determining the length of the third input object, the length of the third input object being a size of the third input object along the first axis, responsive to the third input object being located in the third sub-region of the sensing region and the length being greater than the length threshold, suppressing reporting of the third input object, wherein the length threshold is constant in the third sub-region, wherein the second sub-region of the sensing region substantially surrounds the first sub-region and the third sub-region of the sensing region substantially surrounds the second sub-region, and wherein the first sub-region is less suppressive of input objects than the second sub-region and the second sub-region is less suppressive of input objects than the third sub-region.

* * * * *